US012456794B2

(12) United States Patent
Toomey et al.

(10) Patent No.: US 12,456,794 B2
(45) Date of Patent: Oct. 28, 2025

(54) HIGH STIFFNESS TRIPOD FOR MAN TRANSPORTABLE SATCOM ANTENNA

(71) Applicant: Raytheon Company, Waltham, MA (US)

(72) Inventors: Michael A. Toomey, Marlborough, MA (US); Paul J. Marchetti, Dracut, MA (US); Craig Richardson, Watertown, MA (US); Jonathan J. Flick, Boylston, MA (US); Derik S. Thomann, Waltham, MA (US)

(73) Assignee: RTX Corporation, Arlington, VA (US)

( * ) Notice: Subject to any disclaimer, the term of this patent is extended or adjusted under 35 U.S.C. 154(b) by 177 days.

(21) Appl. No.: 18/457,828

(22) Filed: Aug. 29, 2023

(65) Prior Publication Data

US 2025/0079685 A1 Mar. 6, 2025

(51) Int. Cl.
*H01Q 1/12* (2006.01)
*H01Q 1/28* (2006.01)

(52) U.S. Cl.
CPC .......... *H01Q 1/1235* (2013.01); *H01Q 1/288* (2013.01)

(58) Field of Classification Search
CPC ............................ H01Q 1/1235; H01Q 1/288
See application file for complete search history.

(56) References Cited

U.S. PATENT DOCUMENTS 10,330,245 B2 6/2019 Meuret et al.

OTHER PUBLICATIONS

MetrologyWorks, Inc., BlackMAX Heavy-Duty Portable Tripod for Portable CMMs with Universal 3-½"-8 Threaded Ring, https://www.metrologyworks.com/product/blackmax-heavy-duty-portable-tripod-for-portable-cmms-including-faro-arms/, Aug. 29, 2023.
AvL Technologies, 1.2m Tri-Band Manual FlyAway Antenna, https://www.avltech.com/products/21423/21, Aug. 29, 2023.

*Primary Examiner* — Graham P Smith
(74) *Attorney, Agent, or Firm* — Kinney & Lange, P.A.

(57) ABSTRACT

A tripod for a transportable SATCOM antenna includes a base with a frame centered on a center axis. A first leg is connected to the frame of the base by a first hinge, a second leg is connected to the frame of the base by a second hinge, and a third leg is connected to the frame of the base by a third hinge. A first strut extends from the first leg to the second leg, a second strut extends from the second leg to the third leg, and a third strut extends from the third leg to the first leg. The first strut, the second strut, and the third strut each include a first strut segment, a second strut segment, and a hinge connecting the first strut segment and the second strut segment. A locking collar is on the first strut segment and extends over the hinge.

11 Claims, 7 Drawing Sheets

HIGH STIFFNESS TRIPOD FOR MAN TRANSPORTABLE SATCOM ANTENNA

STATEMENT OF GOVERNMENT INTEREST

This invention was made with government support. The government has certain rights in the invention.

BACKGROUND

The present disclosure relates generally to SATCOM antenna systems and, more particularly, to support structures for portable SATCOM antenna systems.

High frequency tracking SATCOM antennas require a high stiffness connection to earth to maintain accurate antenna pointing. Existing tripods are designed for instruments such as cameras, theodolites, or telescopes and do not have sufficient stiffness for pointing high frequency tracking SATCOM antennas in wind and handling inertial loads that develop from the motion of high frequency tracking SATCOM antennas.

SUMMARY

A tripod for a transportable SATCOM antenna includes a base with a frame centered on a center axis of the base and an annular inner surface extending circumferentially about the center axis of the base. A first leg is connected to the frame of the base by a first hinge, a second leg is connected to the frame of the base by a second hinge, and a third leg is connected to the frame of the base by a third hinge. A first strut extends from the first leg to the second leg, a second strut extends from the second leg to the third leg, and a third strut extends from the third leg to the first leg. The first strut, the second strut, and the third strut each include a first strut segment, a second strut segment, and a hinge connecting the first strut segment and the second strut segment. A groove is formed in the first strut segment and extends at least partially around the first strut segment. A first detent is formed in a bottom of the groove. A second detent is also formed in the bottom of the groove and is circumferentially spaced from the first detent relative to a central axis of the first strut segment. A locking collar is on the first strut segment and extends over the hinge. The locking collar includes a body extending from a first end to a second end and a bore extending from the first end to the second end through the body. The first strut segment extends through the bore. At least one guide pin extends radially inward into the bore and into the groove. A spring-loaded plunger pin extends radially inward into the bore, into the groove, and into the first detent or the second detent. A cutout formed in the body that extends from the second end toward the first end and extends over the hinge.

A tripod for a transportable SATCOM antenna includes a base with a hexagonal frame extending circumferentially around the annular inner surface. A first leg is connected to a first side of the hexagonal frame by a first hinge. The first leg includes a first end, a second end opposite the first end, and a first contact plate connected to the first end of the first leg and facing a second contact plate fastened to the first side of the hexagonal frame. The first contact plate contacts the second contact plate when the first leg is in a deployed position of the tripod. A second leg is connected to a third side of the hexagonal frame by a second hinge. The second leg includes a first end, a second end opposite the first end of the second leg, and a third contact plate connected to the first end of the second leg and facing a fourth contact plate fastened to the third side of the hexagonal frame. The third contact plate contacts the fourth contact plate when the second leg is in the deployed position. A third leg is connected to a fifth side of the hexagonal frame by a third hinge. The third leg includes a first end, a second end opposite the first end of the third leg, and a fifth contact plate connected to the first end of the third leg and facing a sixth contact plate fastened to the fifth side of the hexagonal frame. The fifth contact plate contacts the sixth contact plate when the third leg is in the deployed position.

The present summary is provided only by way of example, and not limitation. Other aspects of the present disclosure will be appreciated in view of the entirety of the present disclosure, including the entire text, claims and accompanying figures.

Figure 1:
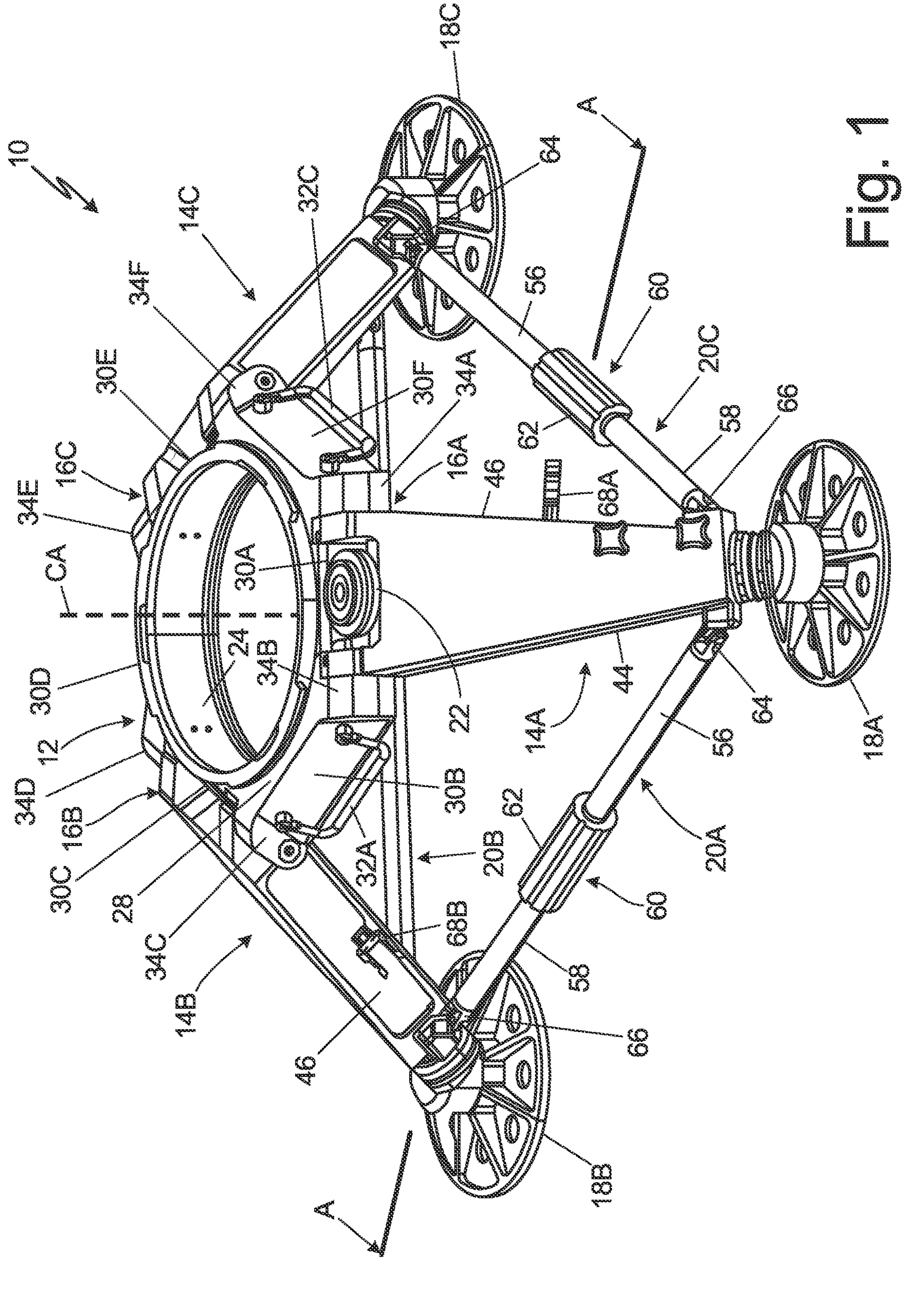
FIG. 1 is a perspective view of a tripod for supporting a man-portable SATCOM antenna, with the tripod in a deployed position.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

A tripod is disclosed for supporting SATCOM antennas that is high in stiffness yet lightweight and collapsible for transportability. The tripod can include several features that maximizes a natural frequency of the tripod while minimizing deflections due to wind and/or movement of a SATCOM antenna on the tripod. The tripod is rapidly deployable without the use of tools and can also be set up while wearing artic weather gear. The tripod is described in detail below with reference to FIGS. 1-7.

Figure 2:
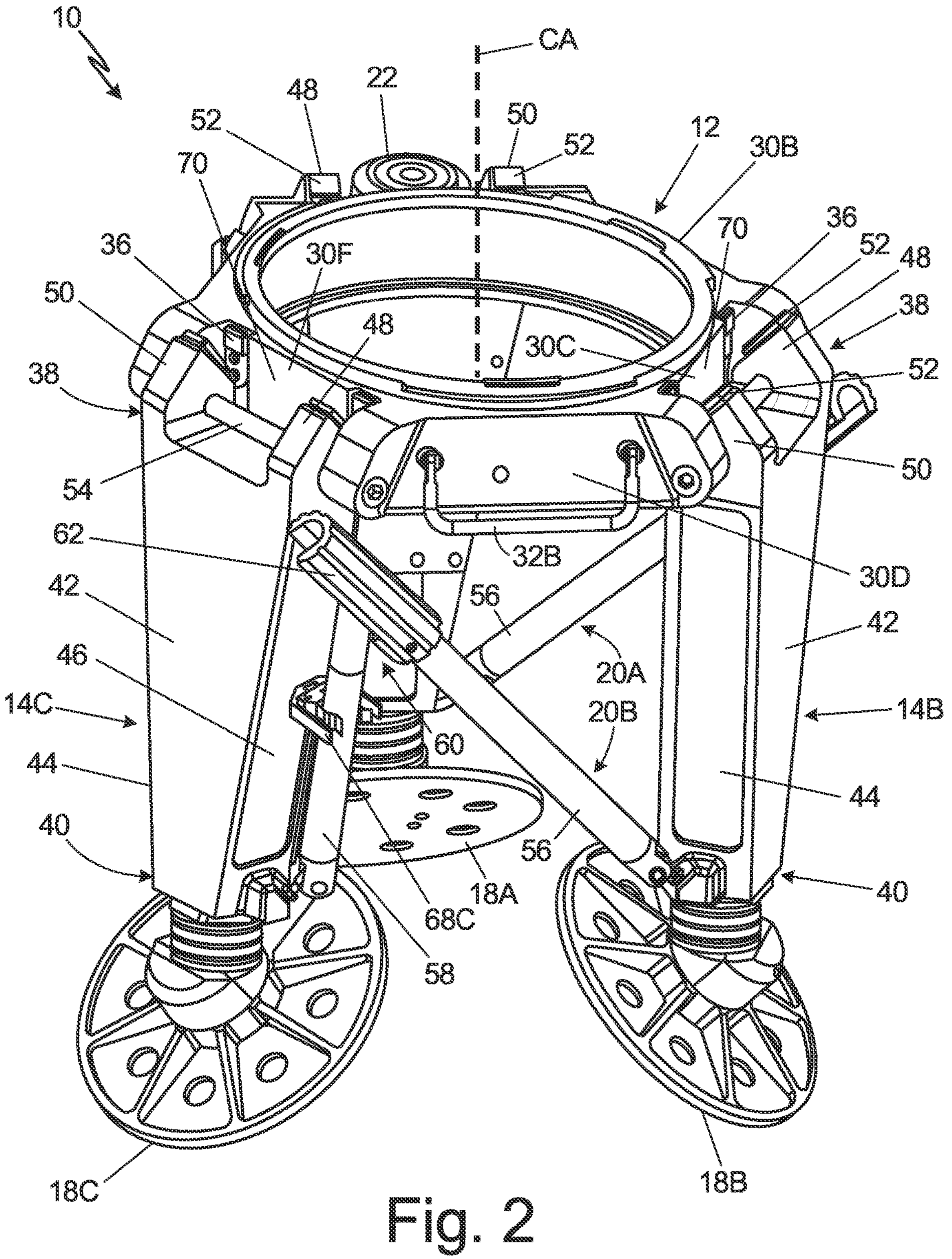
FIG. 2 is a perspective view of the tripod of FIG. 1 in a stowed position.
Figure 3A:
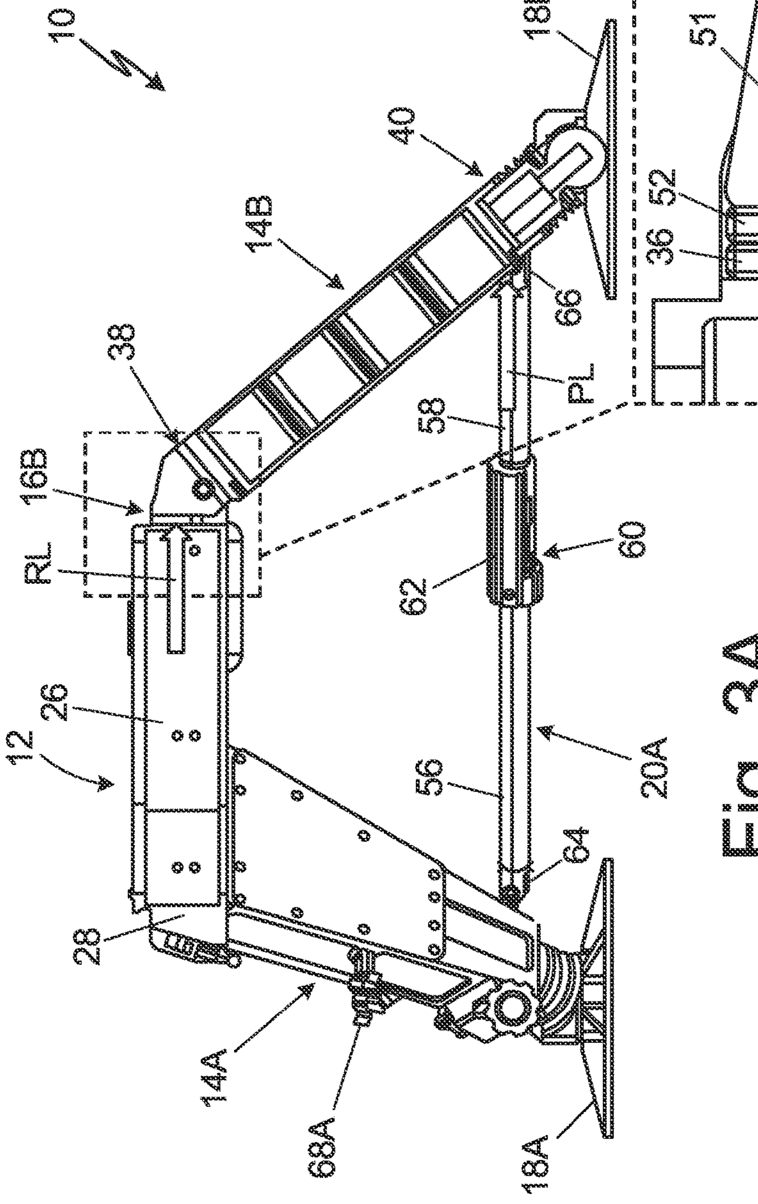
FIG. 3A is cross-sectional view of the tripod of FIG. 1 taken along line A-A in FIG. 1.
Figure 3B:
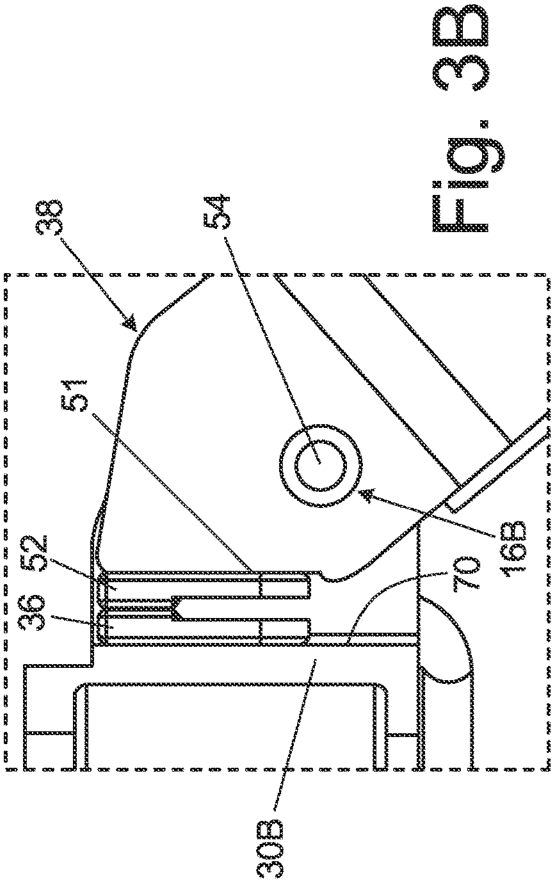
FIG. 3B is an expanded cross-sectional view of a hinge of the tripod from FIG. 3A.

FIGS. 1-3B will be discussed concurrently. FIGS. 1 and 2 both show perspective views of an example of tripod 10 for supporting a man-portable SATCOM antenna (not shown). FIG. 1 shows a perspective view of tripod 10 in a deployed position and FIG. 2 shows a perspective view of tripod 10 in a stowed position and rotate 180 degrees about center axis CA. FIG. 3A is cross-sectional view of tripod 10 of FIG. 1 taken along line A-A in FIG. 1. FIG. 3B is an expanded cross-sectional view of a hinge of tripod 10 from FIG. 3A. As shown in FIGS. 1-3B tripod 10 includes base 12, first leg 14A, second leg 14B, third leg 14C, first hinge 16A, second hinge 16B, third hinge 16C, first foot pad 18A, second foot pad 18B, third foot pad 18C, first strut 20A, second strut 20B, and third strut 20C. In the example of FIGS. 1-3B, base 12 includes planar bubble level 22, interface ring 24 with annular inner surface 26, and frame 28 with first side 30A, second side 30B, third side 30C, fourth side 30D, fifth side 30E, and sixth side 30F. First side 30A, third side 30C, and fifth side 30E each include flat surface 70. In the example of FIGS. 1-3B, frame 28 also includes first handle 32A, second handle 32B, third handle 32C, first flange 34A, second flange 34B, third flange 34C, fourth flange 34D, fifth flange 34E, sixth flange 34F, and a set of first contact plates 36 (shown best in FIGS. 2-3B). Each of first leg 14A, second leg 14B, and third leg 14C includes first end 38, second end 40, and tapered portion 42 with first angled surface 44 and second angled surface 46. Each of first leg 14A, second leg 14B, and third leg 14C also includes first flange 48, second flange 50, stop faces 51, and a set of second contact plates 52 (shown best in FIGS. 2-3B). As shown best in FIG. 2, each of first hinge 16A, second hinge 16B, and third hinge 16C includes pin 54. First strut 20A, second strut 20B, and third strut 20C each include first strut segment 56, second strut segment 58, locking hinge 60, locking collar 62, first strut hinge 64, and second strut hinge 66. Tripod 10 also includes first retention clip 68A, second retention clip 68B, and third retention clip 68C.

Annular inner surface 26 of base 12 extends circumferentially about center axis CA of base 12. Annular inner surface 26 forms an interface ring and/or track for mounting a high frequency tracking SATCOM antenna to tripod 10. Frame 28 of base 12 extends circumferentially around annular inner surface 26 and is centered on center axis CA. In the example of FIGS. 1-3B, frame 28 is hexagonal with second side 30B extending from first side 30A to third side 30C, fourth side 30D extending from third side 30C to fifth side 30E, and sixth side 30F extending from fifth side 30E to first side 30A. First handle 32A is on second side 30B of frame 28, second handle 32B is on fourth side 30D of frame 28, and third handle 32C is on sixth side 30F of frame 28.

First leg 14A is connected to first side 30A of frame 28 by first hinge 16A. Second leg 14B is connected to third side 30C of frame 28 by second hinge 16B. Third leg 14C is connected to fifth side 30E of frame 28 by third hinge 16C. First flange 34A and second flange 34B extend out from first side 30A of frame 28 to form part of first hinge 16A. Third flange 34C and fourth flange 34D extend out from third side 30C of frame 28 to form part of second hinge 16B. Fifth flange 34E and sixth flange 34F extend out from fifth side 30E of frame 28 to form part of third hinge 16C.

For each of first leg 14A, second leg 14B, and third leg 14C, first end 38 is connected to frame 28 and second end 40 is opposite first end 38. First flange 48 and second flange 50 are formed on first end 38 for each of first leg 14A, second leg 14B, and third leg 14C. First flange 48 and second flange 50 on first end 38 of first leg 14A form part of first hinge 16A and are between first flange 34A and second flange 34B of frame 28. One of pins 54 extends through first flange 34A of frame 28, through first flange 48 and second flange 50 of first leg 14A, and through second flange 34B to complete first hinge 16A. First flange 48 and second flange 50 on first end 38 of second leg 14B form part of second hinge 16B and are between third flange 34C and fourth flange 34D of frame 28. One of pins 54 extends through third flange 34C of frame 28, through first flange 48 and second flange 50 of second leg 14B, and through fourth flange 34D to complete second hinge 16B. First flange 48 and second flange 50 on first end 38 of third leg 14C form part of third hinge 16C and are between fifth flange 34E and sixth flange 34F of frame 28. One of pins 54 extends through fifth flange 34E of frame 28, through first flange 48 and second flange 50 of third leg 14C, and through sixth flange 34F to complete third hinge 16C.

Each of first leg 14A, second leg 14B, and third leg 14C includes tapered portion 42 with first angled surface 44 and second angled surface 46 such that first leg 14A, second leg 14B, and third leg 14C each taper and narrow as first leg 14A, second leg 14B, and third leg 14C each extend away from base 12. Tapering first leg 14A, second leg 14B, and third leg 14C maximizes rotational stiffness of first leg 14A, second leg 14B, and third leg 14C while minimizing weight, which is important for resisting azimuth drive rotational inertia of a SATCOM antenna. First foot pad 18A is connected to second end 40 of first leg 14A, second foot pad 18B is connected to second end 40 of second leg 14B, and third foot pad 18C is connected to second end 40 of third leg 14C.

First strut 20A extends from first leg 14A to second leg 14B. First strut 20A is connected to first leg 20A by first strut hinge 64 of first strut 20A and is connected to second leg 14B by second strut hinge 66 of first strut 20A. Second strut 20B extends from second leg 14B to third leg 14C. Second strut 20B is connected to second leg 14B by first strut hinge 64 of second strut 20B and is connected to third leg 14C by second strut hinge 66 of second strut 20B. Third strut 20C extends from third leg 14C to first leg 14A. Third strut 20C is connected to third leg 14C by first strut hinge 64 of third strut 20C and is connected to first leg 14A by second strut hinge 66 of third strut 20C. First strut 20A, second strut 20B, and third strut 20C is each divided into first strut segment 56 and second strut segment 58. Locking hinge 60 connects first strut segment 56 to second strut segment 58. Locking hinge 60 allows a single degree of freedom between first strut segment 56 and second strut segment 58.

Locking collar 62 is connected to first strut segment 56 and extends over locking hinge 60 and a portion of second strut segment 56. Each locking collar 62 of tripod 10 forms a hand grip that allows a human operator to push down on first strut 20A, second strut 20B, and third strut 20C to move tripod 10 into the deployed position. Locking collar 62 also rotates a quarter-turn around locking hinge 60 to lock locking hinge 60 and prevent first strut 20A, second strut 20B, and third strut 20C from bending and collapsing tripod 10 out of the deployed position. Counter rotating locking collar 62 allows locking hinge 60 to move so that each of first strut 20A, second strut 20B, and third strut 20C can bend to collapse tripod 10 into the stowed position. Thus, setting up tripod 10 into the deployed position and collapsing tripod 10 into the stowed position can be performed without tools and can even be performed while wearing heavy artic gloves.

First retention clip 68A is connected to second angled surface 46 of first leg 14A. First retention clip 68A receives second strut segment 58 of third strut 20C when tripod 10 is in the stowed position. Second retention clip 68B is connected to second angled surface 46 of second leg 14B. Second retention clip 68B receives second strut segment 58 of first strut 20A when tripod 10 is in the stowed position. Third retention clip 68C is connected to second angled surface 46 of third leg 14C. Third retention clip 68C receives second strut segment 58 of second strut 20B when tripod 10 is in the stowed position. As shown in FIG. 2, second strut segment 58 for each of first strut 20A, second strut 20B, and third strut 20C is shorter than first strut segment 56. Making second strut segment 58 unequal in length from first strut segment 56 allows tripod 10 to compactly and efficiently fold such that each second strut segment 58 clips into one of first retention clip 68A, second retention clip 68B, and third retention clip 68C when tripod 10 is in the stowed position.

First strut 20A is slightly longer than the distance between first leg 14A and second leg 14B. Because first strut 20A is slightly oversized, first strut 20A is under compressive loading between first leg 20A and second leg 14B when tripod 10 is in the deployed position. Second strut 20B is slightly longer than the distance between second leg 14B and third leg 14C. Since second strut 20B is slightly oversized, second strut 20B is under compressive loading between second leg 20B and third leg 20C when tripod 10 is in the deployed position. Third strut 20C is slightly longer than the distance between third leg 14C and first leg 14A. Since third strut 20C is slightly oversized, third strut 20C is under compressive loading between third leg 20C and first leg 20A when tripod 10 is in the deployed position.

As shown best in FIGS. 2-3B, the first set of contact plates 36 are mounted onto frame 28 and the second set of contact plates 52 are mounted onto first leg 14A, second leg 14B, and third leg 14C. Flat surface 70 is formed on first side 30A between first flange 34A and second flange 34B, is formed on third side 30C between third flange 34C and fourth flange 34D, and is formed on fifth side 30E between fifth flange 34E and sixth flange 34F. A pair of contact plates 36 are mounted on flat surface 70 and face toward first flange 48 and second flange 50 of first leg 14A, second leg 14B, or third leg 14C. Each of first flange 48 and second flange 50 of first leg 14A, second leg 14B, and third leg 14C includes stop face 51 that is a flat surface that faces toward contact plates 52 on frame 28. Each contact plate 52 is connected to one of stop faces 51. When tripod 10 is in the deployed position, first strut 20A, second strut 20B, and third strut 20C force first leg 14A, second leg 14B, and third leg 14C to swinge outward from center axis CA until the second set of contact plates 52 contact the first set of contact plates 36.

As shown in FIG. 3A, the compressive loading of first strut 20A, second strut 20B, and third strut 20C causes the second set of contact plates to press against the first set of contact plates 36 to create a reaction loadthat balances a preload PL on first leg 14A, second leg 14B, and third leg 14C. This preloading of struts 20A, 20B, and 20C and contact plates 36 and 52 causes tripod 10 to form an ultra-stiff tetrahedral structure when tripod 10 is in the deployed position that removes all clearances from the pivot joints and precludes displacements due to joint slop. Tripod 10, when in the deployed position, has double the natural frequency of existing tripods and can handle three times the rotational and tilting deflection of existing similarly-sized tripods.

Figure 4:
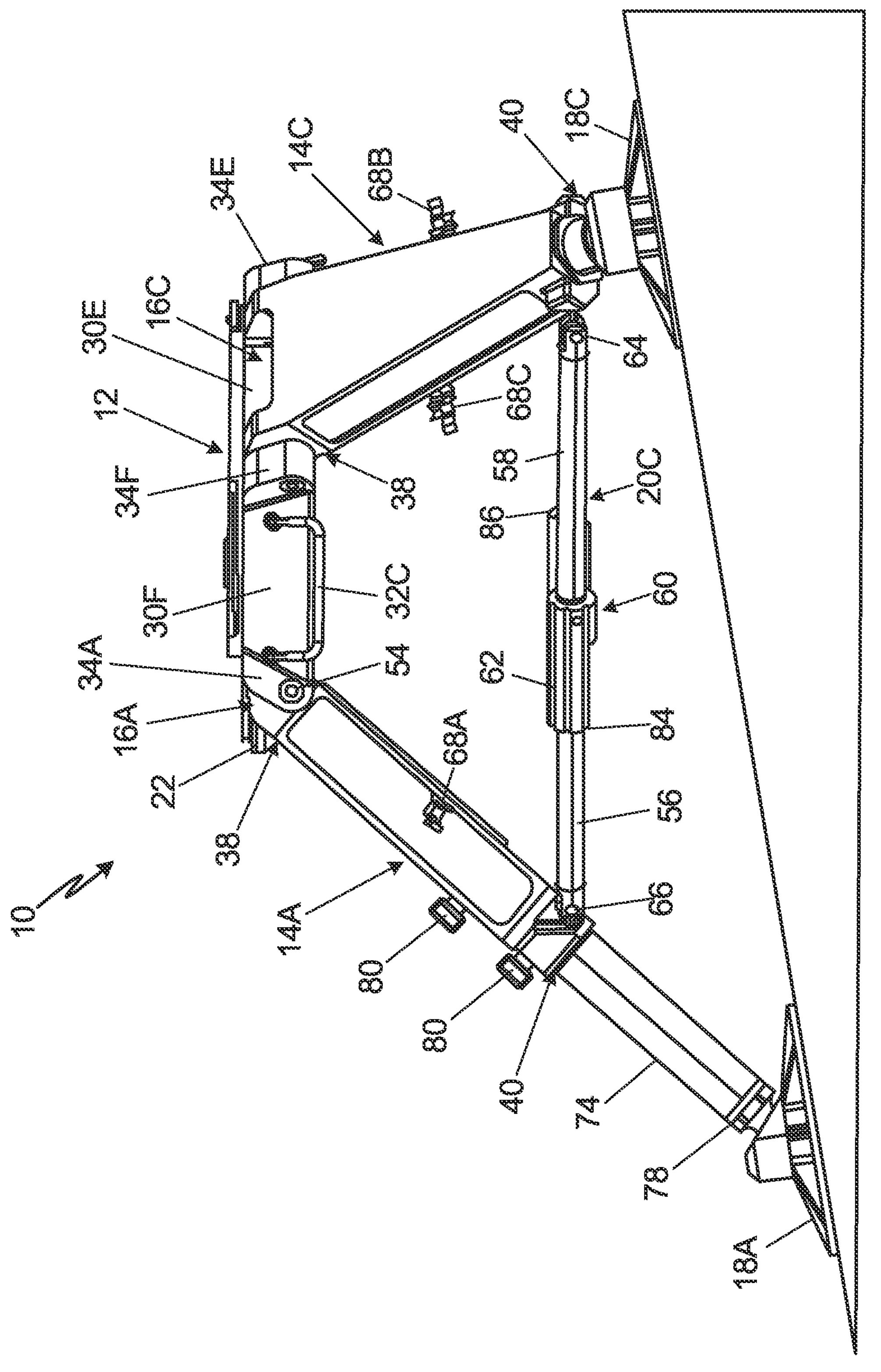
FIG. 4 is a side elevation view of the tripod from FIG. 1 with a leg extended.

FIG. 4 is a side elevation view of tripod 10 from FIGS. 1 and 2 deployed on a non-level surface with first leg 14A extended. As shown in FIG. 4 first leg 14A includes extension rod 74 with an upper end (not shown) telescopically received by second end 40 of first leg 14A. A distal end 78 of extension rod 74 is connected to first foot pad 18A such that extension rod 74 connects first foot pad 18A to second end 40 of first leg 14A. Threaded tighteners 80 can thread into first leg 14A and extend through first leg 14A to frictionally engage with extension rod 74. When tripod 10 is deployed on a non-level surface, threaded tighteners 80 can be turned to disengage threaded tighteners 80 from extension rod 74 such that extension rod 74 can slide relative to second end 40 of first leg 14A and can extend out from second end 40 of first leg 14A to adjust and level tripod 10 on the non-level surface. Planar bubble level 22 can be used to determine when base 12 of tripod 10 is level. Once base 12 of tripod 10 is level and first foot pad 18A, second foot pad 18B, and third foot pad 18C are all contacting the non-level surface, threaded tighteners 80 can be turned to frictional engage threaded tighteners 80 with extension rod 74 to keep extension rod 74 from sliding back into first leg 14A. While the example of FIG. 4 only shows first leg 14A with extension rod 74 and threaded tighteners 80, each of second leg 14B and third leg 14C can also include extension rod 74 and threaded tighteners 80 in an arrangement similar to that of first leg 14A.

Figure 5A:
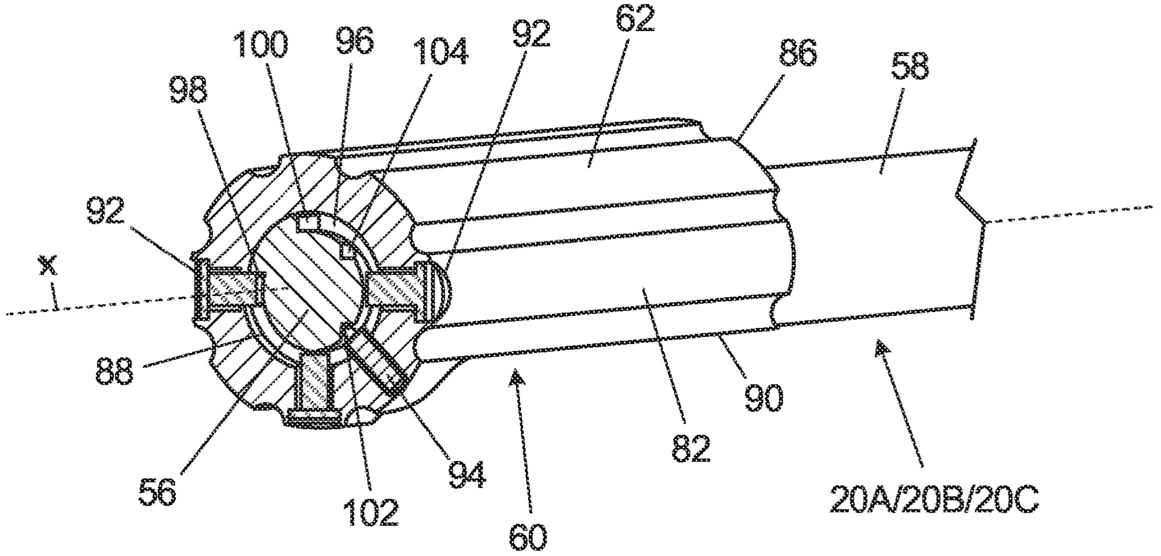
FIG. 5A is a cross-sectional view of a locking collar of a strut of the tripod from FIG. 1 with the locking collar in an unlocked position.
Figure 5B:
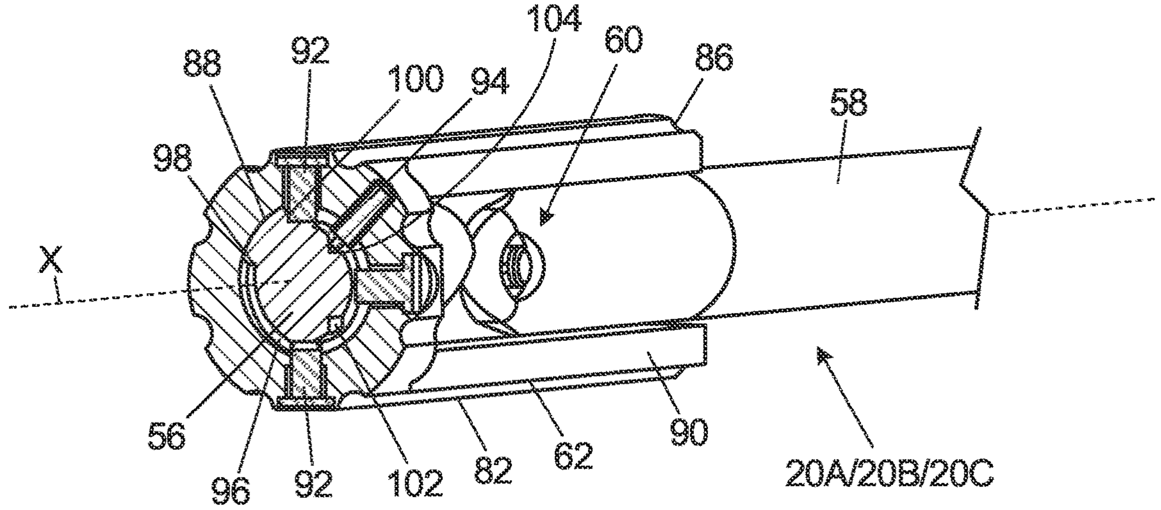
FIG. 5B is a cross-sectional view of the locking collar from FIG. 5A rotated to a locked position.

FIGS. 5A and 5B will be discussed concurrently. FIG. 5A is a cross-sectional view locking collar 62 of first strut 20A of tripod 10 from FIG. 1 with locking collar 62 in an unlocked position. FIG. 5B is a cross-sectional view of locking collar 62 from FIG. 5A rotated to a locked position. As shown in FIGS. 5A and 5B, locking collar 62 includes body 82, first end 84 (removed by the cross-section but visible in FIG. 4), second end 86, bore 88, cutout 90, guide pins 92, and spring-loaded plunger pin 94. First strut segment 56 of first strut 20A includes groove 96, first pin stop 98, second pin stop 100, first detent 102, and second detent 104.

As previously noted in the discussion of FIGS. 1 and 2, locking hinge 60 connects first strut segment 56 to second strut segment 58. Locking hinge 60 allows a single degree of freedom between first strut segment 56 and second strut segment 58. Groove 96 is formed in first strut segment 56 and extends at least partially around first strut segment 56. In the example of FIGS. 5A and 5B, groove 96 forms a grooved track that extends radially into first strut segment 56 and circumferentially around first strut segment 56 from first pin stop 98 to second pin stop 100 and relative to a central axis X of first strut segment 56. First pin stop 98 and second pin stop 100 are each a surface that extends radially from a bottom of groove 96 to an outer surface of first strut segment 56. First detent 102 and second detent 104 are both formed in the bottom of groove 96. Second detent 104 is spaced circumferentially from first detent 102 relative the central axis X. First detent 102 and second detent 104 are depressions in the bottom of groove 96 and can be conical in shape to mate with a tip of spring-load plunger pin 94 of locking collar 62.

Locking collar 62 is connected to first strut segment 56 and extends over locking hinge 60. Body 82 of locking collar 62 extends from first end 84 to second end 86 of locking collar 62. Bore 88 extends from first end 84 to second end 86 through body 82 of locking collar 62. Bore 88 is sized in diameter such that first strut segment 56, locking hinge 60, and second strut segment 58 can extend into or through bore 88. Cutout 90 is formed in body 82 of locking collar 62 and extends from second end 86 toward first end 84 and extends over locking hinge 60. Cutout 90 forms a window in locking collar 62 that is large enough for second strut segment 58 to swing out of bore 88 about locking hinge 60 when locking collar 62 is in the unlocked position, which is shown in FIG. 5A.

Guide pins 92 extend, relative to central axis X, radially inward into body 82, inward into bore 88, and into groove 96. Guide pins 92 are sized in diameter such that there is enough clearance between guide pins 92 and groove 96 that guide pins 92 do not prevent locking collar 62 from rotating relative to first strut segment 56. Spring-loaded plunger pin 94 extends radially inward from body 82 of locking collar 62 into bore 88, into groove 96, and into first detent 102 or second detent 104. The tip of spring-loaded plunger pin 94 can be spherical to mate with first detent 102 and second detent 104. Spring-loaded plunger pin 94 includes a compressed spring that biases the tip of spring-loaded plunger pin 94 against first detent 102, second detent 104, or the bottom of groove 96 depending on the position of locking collar 62. When locking collar 62 is in the unlocked position, shown in FIG. 5A, the tip of spring-loaded plunger pin 94 is in first detent 102 and one of guide pins 92 contacts first pin stop 98 to prevent over-rotation of locking collar 62 in the clockwise direction. When locking collar 62 is in the locked position, as shown in FIG. 5B, the tip of spring-loaded plunger pin is in second detent 104 and one of guide pins 92 contacts second pin stop 100 to prevent over-rotation of locking collar 62 in the counter-clockwise direction. Guide pins 92 and groove 96 therefore serve to provide positive stops for the end range of rotational motion of the locking collar 62 and also provides an axial constraint that prevents the locking collar 62 from moving along the axis of the first strut segment 56. The conical shape of first detent 102, second detent 104, and the spherical tip spring-loaded plunger pin 94 provides sufficient retention in the locked and unlocked rotational positions of the locking collar 62 while allowing spring loaded plunger pin 94 to be urged out of first detent 102 or second detent 104 to rotate locking collar 62 about central axis X between the locked position and the unlocked position. While FIGS. 5A and 5B have been discussed with regards to locking collar 62 of first strut 20A, the description of FIGS. 5A and 5B can also apply to locking collar 62 of second strut 20B (shown in FIGS. 1 and 2) and to locking collar 62 of third strut 20C (also shown in FIGS. 1 and 2). Tripod 10 can include additional features that stabilize tripod 10 against rattling and movement when in the deployed or stowed position, as discussed below with reference to FIGS. 6 and 7.

Figure 6:
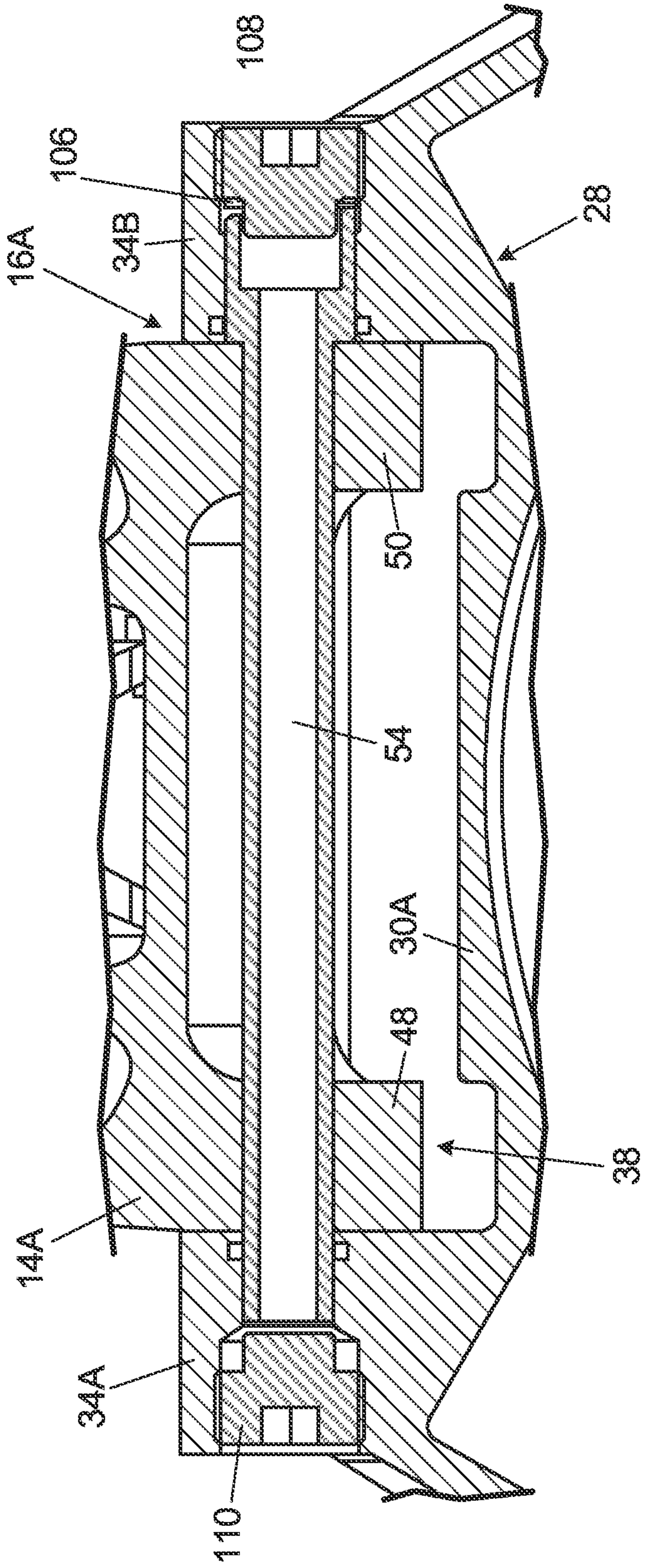
FIG. 6 is a cross-sectional view of a hinge of the tripod from FIG. 1.

FIG. 6 is a cross-sectional view of first hinge 16A of tripod 10 from FIG. 1. As shown in FIG. 6, pin 54 of first hinge 16A connects first flange 48 and second flange 50 of first end 38 of first leg 14A to first flange 34A and second flange 34B of frame 28. To prevent first leg 14A from swinging and rattling when tripod 10 is in the stowed position (shown in FIG. 2), first hinge 16A can include axial spring 106. Axial spring 106 is compressed against a head of pin 54 to generate frictional resistance to swinging of first leg 14A when first leg 14A is not in the deployed position. Axial spring 106 can be a wave spring or any other kind of spring that generates friction in first hinge 16A to reduce swinging of first leg 14A. In the example of FIG. 6, first cap 108 can cover the head of pin 54 and axial spring 106 is compressed between first cap 108 and the head of pin 54. Second cap 110 can cover an end of pin 54 to reduce contamination of first hinge 16A from dust and dirt. While the discussion of FIG. 6 is directed to first hinge 16A, the description of FIG. 6 can also apply to second hinge 16B and third hinge 16C of tripod 10 from FIG. 1. Thus, second hinge 16B can include a second axial spring 106 and third hinge 16C can include a third axial spring 106.

Figure 7:
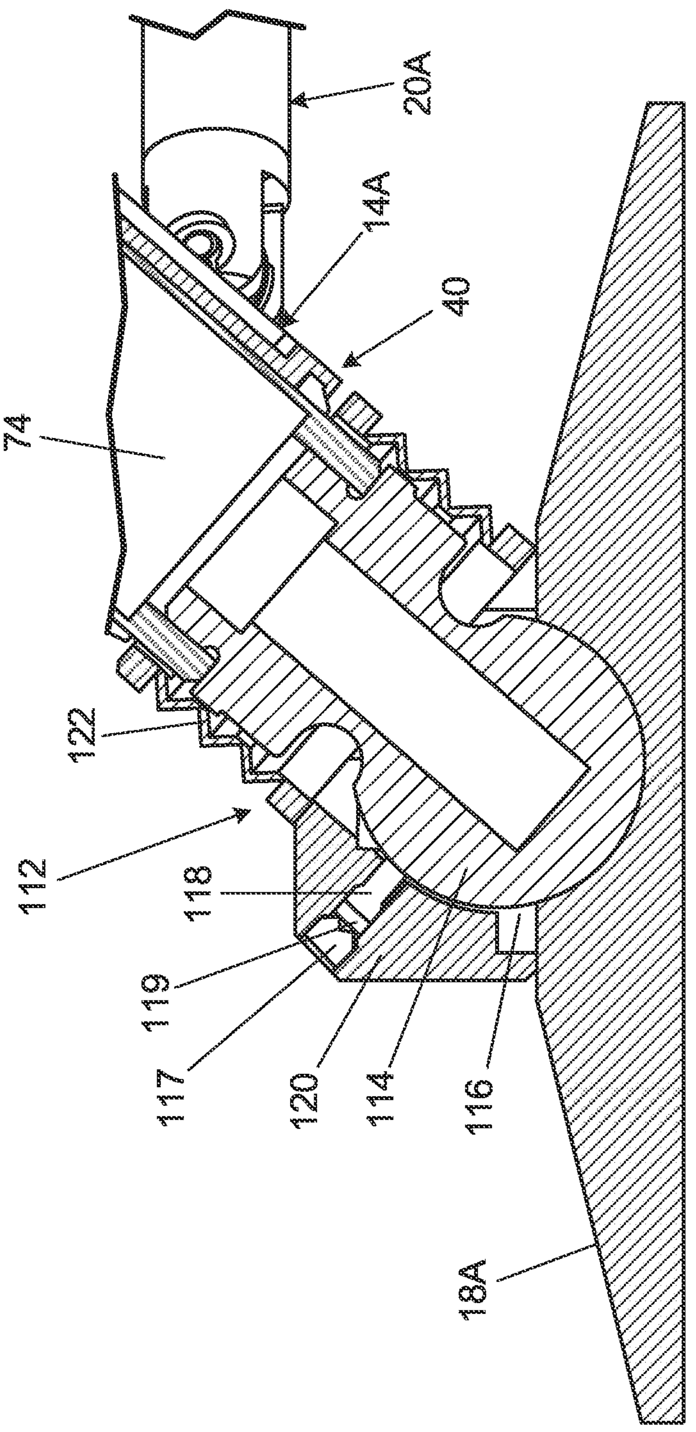
FIG. 7 is a cross-sectional view of a foot pad of the tripod from FIG. 1.

FIG. 7 is a cross-sectional view of first foot pad 18A of tripod 10 from FIG. 1. As shown in FIG. 7, first foot pad 18A is connected to first leg 14A by joint 112. Joint 112 is a ball and socket joint that includes ball 114, socket 116, friction pad 118, friction pad housing 120, and accordion cover 122. Ball 114 is connected to second end 40 of first leg 14A. In the example of FIG. 7, ball 114 is connected to distal end 78 of extension rod 74 and extension rod 74 connects ball 114 to second end 40 of first leg 14A. Socket 116 is formed by first foot pad 18A and friction pad housing 120 and is sized to receive ball 114. Friction pad housing 120 is wedge-shaped and connected to a top side of first foot pad 18A. Friction pad 118 is a plastic or soft metal shouldered pin that is inserted into the outboard end of friction pad housing 120 and extends into socket 116 to frictionally interface with a surface of ball 114. Friction pad 118 is preloaded against ball 114 using compression spring 119 and set screw 117 to prevent first foot pad 18A from rattling during transport of tripod 10. Accordion cover 122 is an annular and flexible cover made from plastic or rubber that extends between joint 112 and distal end 78 of extension rod 74 and/or second end 40 of first leg 14A and prevents dust and debris from entering socket 116.

While the discussion of FIG. 7 is directed to first foot pad 18A and first leg 14A, the description of FIG. 7 can also apply to second foot pad 18B and second leg 14A, and can also apply to third foot pad 18C and third leg 14C of tripod 10 from FIG. 1. Thus, each of second foot pad 18B and third foot pad 18C can also include joint 112 with ball 114, socket 116, friction pad 118, friction pad housing 120, and accordion cover 122 in the same or similar configuration as described above with reference to FIG. 7.

Discussion of Possible Embodiments

[K&L is to reproduce all claims in the specification in a manner that will support multiply-dependent claims later filed in Europe, i.e., all dependent claims should be rewritten to recite, e.g., "in any of the foregoing xyz embodiments, the xyz may additionally or alternatively include . . . "]

The following are non-exclusive descriptions of possible embodiments of the present invention.

A . . .

The of the preceding paragraph can optionally include, additionally and/or alternatively, any one or more of the following features, configurations and/or additional components:

[For Example: A fan drive gear system for a gas turbine engine according to an exemplary embodiment of this disclosure, among other possible things includes (language from claim 1 as a sentence).

A further embodiment of the foregoing fan drive gear system, wherein (permissive language from claim 2 as a sentence).

A further embodiment of any of the foregoing fan drive gear systems, wherein (permissive language from claim 3).]

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A tripod for a transportable SATCOM antenna, the tripod comprising:

a base comprising:

a frame centered on a center axis of the base; and an annular inner surface extending circumferentially about the center axis of the base;
a first leg connected to the frame of the base by a first hinge;
a second leg connected to the frame of the base by a second hinge;
a third leg connected to the frame of the base by a third hinge;
a first strut extending from the first leg to the second leg;
a second strut extending from the second leg to the third leg; and
a third strut extending from the third leg to the first leg, and
wherein the first strut, the second strut, and the third strut each comprise:
a first strut segment;
a second strut segment;
a hinge connecting the first strut segment and the second strut segment;
a groove formed in the first strut segment and extending at least partially around the first strut segment;
a first detent formed in a bottom of the groove;
a second detent formed in the bottom of the groove and circumferentially spaced from the first detent relative a central axis of the first strut segment;
a locking collar on the first strut segment and extending over the hinge, wherein the locking collar comprises:
a body extending from a first end to a second end;
a bore extending from the first end to the second end through the body, wherein the first strut segment extends through the bore;
at least one guide pin extending radially inward into the bore and into the groove;
a spring-loaded plunger pin extending radially inward into the bore, into the groove, and into the first detent or the second detent; and
a cutout formed in the body, wherein the cutout extends from the second end toward the first end and extends over the hinge.

2. The tripod of claim 1, wherein the first leg, the second leg, and the third leg each taper and narrow as the first leg, the second leg, and the third leg each extend away from the base.

3. The tripod of claim 2, wherein:
the first leg, the second leg, and the third leg each comprise:
a first end connected to the frame;
a second end opposite the first end; and
a first contact plate fastened to the first end and facing the frame; and
the frame comprises:
a plurality of second contact plates fastened to the frame, wherein each second contact plate of the plurality of second contact plates faces and contacts the first contact plate of the first leg, the second leg, or the third leg when the tripod is in a deployed position.

4. The tripod of claim 3, wherein the first strut is under compressive loading between the first leg and the second leg when the tripod is in the deployed position, wherein the second strut is under compressive loading between the second leg and the third leg when the tripod is in the deployed position, and wherein the third strut is under compressive loading between the third leg and the first leg when the tripod is in the deployed position.

5. The tripod of claim 4, wherein the second strut segment is shorter than the first strut segment.

6. The tripod of claim 5, further comprising:
a first clip connected to the first leg, wherein the first clip receives the second strut segment of the third strut when the tripod is in a stowed position;
a second clip connected to the second leg, wherein the second clip receives the second strut segment of the first strut when the tripod is in the stowed position; and
a third clip connected to the third leg, wherein the third clip receives the second strut segment of the second strut when the tripod is in the stowed position.

7. The tripod of claim 6, wherein:
the first hinge comprises:
a first pin connecting the first end of the first leg to the frame of the base; and
a first axial spring compressed against a head of the first pin to generate frictional resistance to swinging of the first leg;
the second hinge comprises:
a second pin connecting the first end of the second leg to the frame of the base; and
a second axial spring compressed against a head of the second pin to generate frictional resistance to swinging of the second leg; and
the third hinge comprises:
a third pin connecting the first end of the third leg to the frame of the base; and
a third axial spring compressed against a head of the third pin to generate frictional resistance to swinging of the third leg.

8. The tripod of claim 7, further comprising:
a first foot pad connected to a second end of the first leg by a first ball and socket joint;
a first friction pad preloaded against a ball of the first ball and socket joint;
a second foot pad connected to a second end of the second leg by a second ball and socket joint;
a second friction pad preloaded against a ball of the second ball and socket joint;
a third foot pad connected to a second end of the third leg by a third ball and socket joint; and
a third friction pad preloaded against a ball of the third ball and socket joint.

9. The tripod of claim 8, further comprising:
an extension rod telescopically received by the second end of the first leg and connecting the first foot pad to the second end of the first leg.

10. The tripod of claim 9, wherein the frame of the base is hexagonal and comprises:
a first side connected to the first leg by the first hinge;
a third side connected to the second leg by the second hinge;
a fifth side connected to the third leg by the third hinge;
a second side extending from the first side to the third side;
a fourth side extending from the third side to the fifth side; and
a sixth side extending from the fifth side to the first side.

11. The tripod of claim 10, further comprising:
a first handle on the second side;
a second handle on the fourth side; and
a third handle on the sixth side.

* * * * *